United States Patent [19]
Vogel et al.

[11] Patent Number: 5,494,392
[45] Date of Patent: Feb. 27, 1996

[54] ENCAPSULATING GROMMET

[75] Inventors: Mark A. Vogel, Frankfort; Duane Schultz, Lansing, both of Ill.

[73] Assignee: Illinois Tool Works Inc., Glenview, Ill.

[21] Appl. No.: 282,542

[22] Filed: Jul. 29, 1994

[51] Int. Cl.⁶ .............................. F16B 13/06; F16B 19/00
[52] U.S. Cl. ........................ 411/508; 411/61; 411/908
[58] Field of Search ..................... 411/508, 509, 411/510, 908, 913, 15, 44, 48, 71

[56] References Cited

U.S. PATENT DOCUMENTS

| 2,511,512 | 6/1950 | Poupitch | 411/508 |
|---|---|---|---|
| 2,584,812 | 2/1952 | Poupitch | 411/508 |
| 3,342,098 | 9/1967 | Schoplin | 411/15 |
| 3,830,134 | 8/1974 | Erickson . | |
| 4,284,378 | 8/1981 | Mizusawa . | |
| 4,407,618 | 10/1983 | Kimura . | |
| 4,521,148 | 6/1985 | Tanaka | 411/61 |
| 4,802,804 | 2/1989 | Hirohata | 411/908 |
| 5,028,190 | 7/1991 | Loughlin, Jr. et al. . | |
| 5,094,578 | 3/1992 | Light | 411/508 |
| 5,129,768 | 7/1992 | Hoyle et al. . | |
| 5,193,961 | 3/1993 | Hoyle et al. . | |

FOREIGN PATENT DOCUMENTS 1309392  5/1970  United Kingdom .

Primary Examiner—Flemming Saether
Attorney, Agent, or Firm—Kane, Dalsimer, Sullivan, Kurucz, Levy, Eisele and Richard

[57] ABSTRACT

An encapsulating grommet for use with a push-pin for retaining a covering panel or other structure to a supporting panel is molded in an open condition and includes a hinge portion which permits one half of the encapsulating grommet to be folded against the other half. One of the two halves includes a rectangular frame having an opening surrounded by an umbrella-like flange. The other half snap-fits into the rectangular frame when closed so that the encapsulating grommet may be shipped in a closed condition. One of the two halves has a single side wall, while the other half has an inner and outer side wall separated by a channel. When the two halves are closed upon one another, the single side wall fits into the channel, whereby a labyrinth seal against dust and water will be provided for the internal cavity of the encapsulating grommet.

8 Claims, 6 Drawing Sheets

1

ENCAPSULATING GROMMET

BACKGROUND OF THE INVENTION

1. Field of the Invention

The present invention relates generally to fasteners for securing panel-like members together, and, more particularly, it relates to a grommet into which a push-pin may be inserted. The grommet may, for example, be inserted and retained in a fitting hole in a supporting panel, such as a metal door panel of an automobile vehicle, and thereafter to receive the push-pin for mounting a mating panel having a through-hole, such as a decorative lining panel, to the door panel. The grommet is adapted to absorb variations in the relative positions of the supporting panel and the mating panel caused by thermal expansion and contraction due to temperature changes. The grommet is molded in an open condition, and folded to assume an encapsulating condition when it is to be used.

2. Description of the Prior Art

Grommets designed for use in the above-mentioned environment are known in the art.

For example, U.S. Pat. No. 3,830,134 to Erickson shows a one-piece plastic anchor for accommodating a cylindrical expander element, such as a screw threaded fastener, in fixed relation to an apertured workpiece. The anchor member includes an apertured clamping head and a shank section which has a pair of spaced leg members and an oval tubular member spaced from and located between said legs in communication with the head aperture to accommodate the expander element for the purpose of distorting the oval tubular member into engagement with the medial surfaces of said legs to lock the anchor in the workpiece aperture.

U.S. Pat. No. 4,284,378 to Mizusawa shows a fastener for panels, comprising a basal body provided with a flange portion having a circular perforation bored in the central portion thereof for permitting insertion therethrough of a screw, and having a pair of legs extended downwardly from the lower surface of the flange portion so as to be opposed to each other across the line drawn perpendicularly through the center of the circular perforation, and a screw-receiving body disposed between the opposed legs, provided in the upper portion thereof with a pair of receiving pieces protruding sideways out of the openings formed between the opposed legs and further provided with a screw-receiving hole in the axial portion coinciding with the perpendicular line drawn through the center of the perforation. The screw-receiving body is provided with engaging protuberances one each on the lateral surfaces thereof opposite the legs and the legs are provided with oblong-guide holes adapted to receive the engaging protuberances. The work of setting the engaging protuberances into sliding engagement with the oblong guide holes and tightening a screw inserted past the perforation of the flange portion into the screw-receiving hole of the screw-receiving body causes the receiving pieces of the screw-receiving body to be slid in the direction of the flange portion of the basal body and thereby enables a panel to be held fast between the flange portion and the receiving pieces or panels one each between the head of the screw and the flange portion and between the flange portion and the receiving pieces.

British Patent No. 1,309,392 shows an expandable bolt anchoring device suitable for fixing in a hole prepared in brickwork, masonry, concrete or the like comprising a cylindrical shell adapted to be expanded in the hole by means of a tapered nut expansion member which is displaceable within and along the shell, and a bolt having a shank engageable in and through the expansion member, wherein the shell comprises two or more longitudinal segments which can be placed in a confronting relationship to define the shell of which the bore is partially closed at one end by a wall, or entirely closed at said one end by a frangible wall, and open at the other end, the bore being enlarged adjacent the said one end to form a recess which accommodates the expansion member in the unexpanded condition of the shell and which converges towards the open end, the construction being such that, after the shank of the bolt has been turned into the expansion member and through it until it bears on said wall, continued turning of the bolt will displace the expansion member along the shell towards said open end to force the shell segments apart, whereafter any further turning of the bolt is effective to force its shank through the partially closed or frangible wall.

U.S. Pat. No. 4,407,618 to Kimura shows a fastener which comprises a base formed of a flange and a plurality of leg pieces and a screw-receiving member adapted to be embraced between the leg pieces, whereby it is secured onto a given panel by a procedure which involves inserting the leg pieces into a fitting hole bored in advance in the panel, then inserting a fastening screw through a through hole formed in the flange into a screw hole formed within the screw-receiving member, imparting a helical motion of the fastening screw thereby drawing the screw-receiving member toward the flange, consequently causing the leg pieces to be spread outwardly within the fitting hole of the panel and brought into tight engagement with the fitting hole and, at the same time, enabling the fastening screw to be secured onto the panel through the medium of the base.

U.S. Pat. No. 5,028,190 to Loughlin, Jr. et al. shows a one-piece screw anchor adapted for snap-in capture in a substructure elongated rectangular aperture enabling it to slide along the aperture major axis. Upon the insertion of a self-tapping screw in a panel circular opening overlying the screw anchor, the screw tip enters the anchor upper lead-in chamber. If the screw and anchor are misaligned, the screw tip contacts a subjacent one of a pair of opposed anchor ramped side surface portions whereby the anchor is crammed for limited adjustment along the aperture major axis. The anchor ramped surface portions terminate in a lower, elongated channel extending transverse to the major axis. The anchor base wall is adapted to be threadably engaged upon driving the screw at a piercing point in a vertical alignment with the panel opening.

U.S. Pat. No. 5,129,768 to Hoyle et al. shows a sliding grommet including a head flange and a shank portion of a unique construction which is capable of absorbing relative positions of an oblong fitting hole in a mounting panel and a through hole in a mating hole to be attached caused by thermal expansion and contraction. A pair of Y-shaped members are disposed on opposite sides of the shank portion to permit flexing upon insertion, and locking tabs are provided on each leg of the Y-shaped members for retaining freely floating the shank portion in the oblong fitting hole in the mounting panel so as to permit lateral sliding engagement between the upper and lower edges of the fitting hole.

U.S. Pat. No. 5,193,961 to Hoyle et al. shows a pin and grommet assembly including a push-pin and a grommet of unique construction capable of absorbing variations in the relative positions of a supporting panel and a mating panel to be attached caused by thermal expansion and contraction. A pair of diametrically opposed semicylindrical-shaped portions are disposed on the push-pin and cylindrical-shaped mating grooves are formed in the interior of the grommet for retaining freely floating the semicylindrical shaped portions in the grommet so as to permit lateral sliding engagement between the opposed outer wall surfaces on the shorter sides of the main body portion of the grommet.

SUMMARY OF THE INVENTION

The present invention is an encapsulating grommet for retaining a covering panel or other structure to a supporting panel having a rectangular fitting hole by means of a push-pin lockingly mateable therewith and adapted to absorb variations in the relative positions of the supporting panel and the covering panel or other structure.

The encapsulating grommet is an integral member molded from a polymeric resin material, such as polyamide (nylon) 6,6 or any other resin material customarily used by those skilled in the art to mold products of the present type.

The encapsulating grommet comprises a first half body portion and a second half body portion separated from one another by a hinge portion. The two half body portions are foldable toward one another about the hinge portion to form a body portion having a substantially rectangular cross section for mating with the shape of the rectangular fitting hole in the supporting panel and an internal cavity of like cross section.

The first half body portion has a side wall on each of its two lateral edges, and the second half body portion has an inner and an outer side wall separated by a channel on each of its two lateral edges. When the first and second half body portions are folded toward one another about the hinge portion, the side wall of the first half body portion fits into the channel between the inner and outer side walls of the second half body portion to produce a labyrinth seal against dust and water for the internal cavity of the encapsulating grommet.

One of the first and second half body portions has a rectangular frame member with a central opening communicating with and providing access to the internal cavity. The rectangular frame member is surrounded by a head flange having a front surface and a back surface and inclined toward the hinge portion in the manner of an umbrella. The head flange and rectangular frame member are integrally molded and attached to one of the two half body portions to maintain the seal between the grommet and the underlying supporting panel.

The present invention will now be described in more complete detail with frequent reference to the several drawing figures identified as follows:

DETAILED DESCRIPTION OF THE PREFERRED EMBODIMENT

Figure 1:
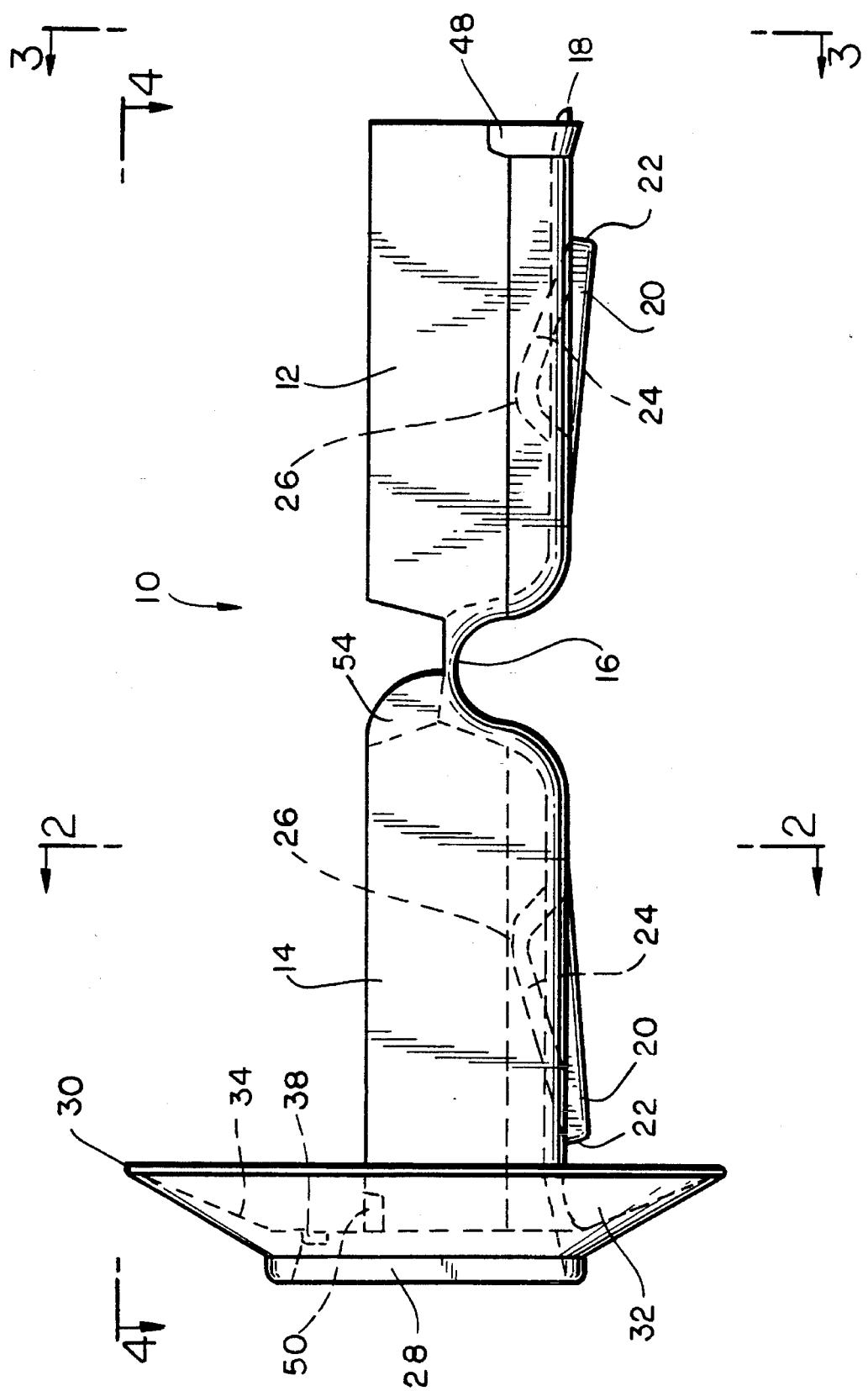
FIG. 1 is a side plan view of the encapsulating grommet of the present invention.

Turning to these figures, FIG. 1 is a side plan view of the encapsulating grommet 10 of the present invention. The encapsulating grommet 10 comprises a first half body portion 12, a second half body portion 14, and a hinge portion 16.

Figure 2:
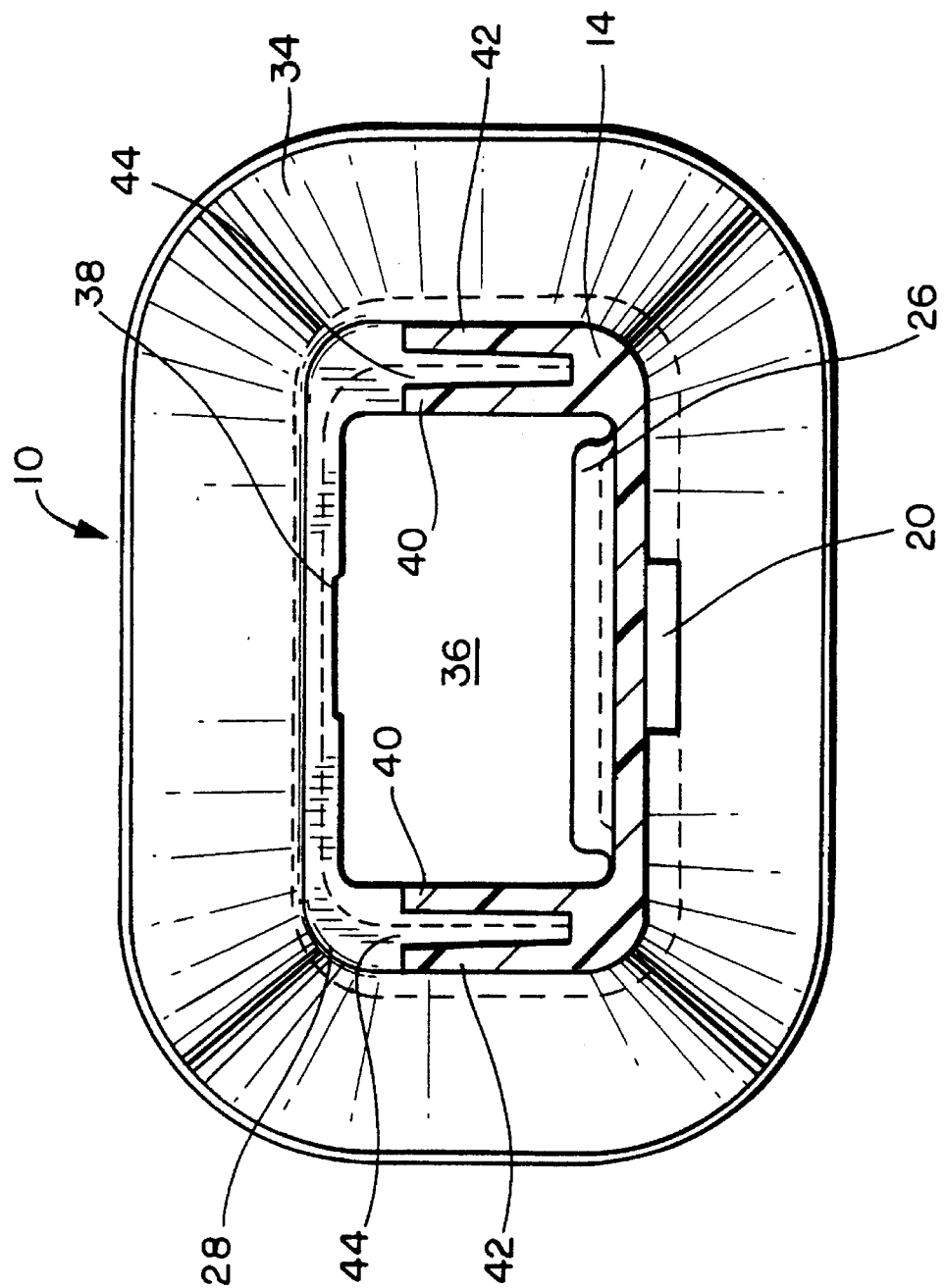
FIG. 2 is a cross sectional view taken as indicated by line 2—2 in FIG. 1.
Figure 3:
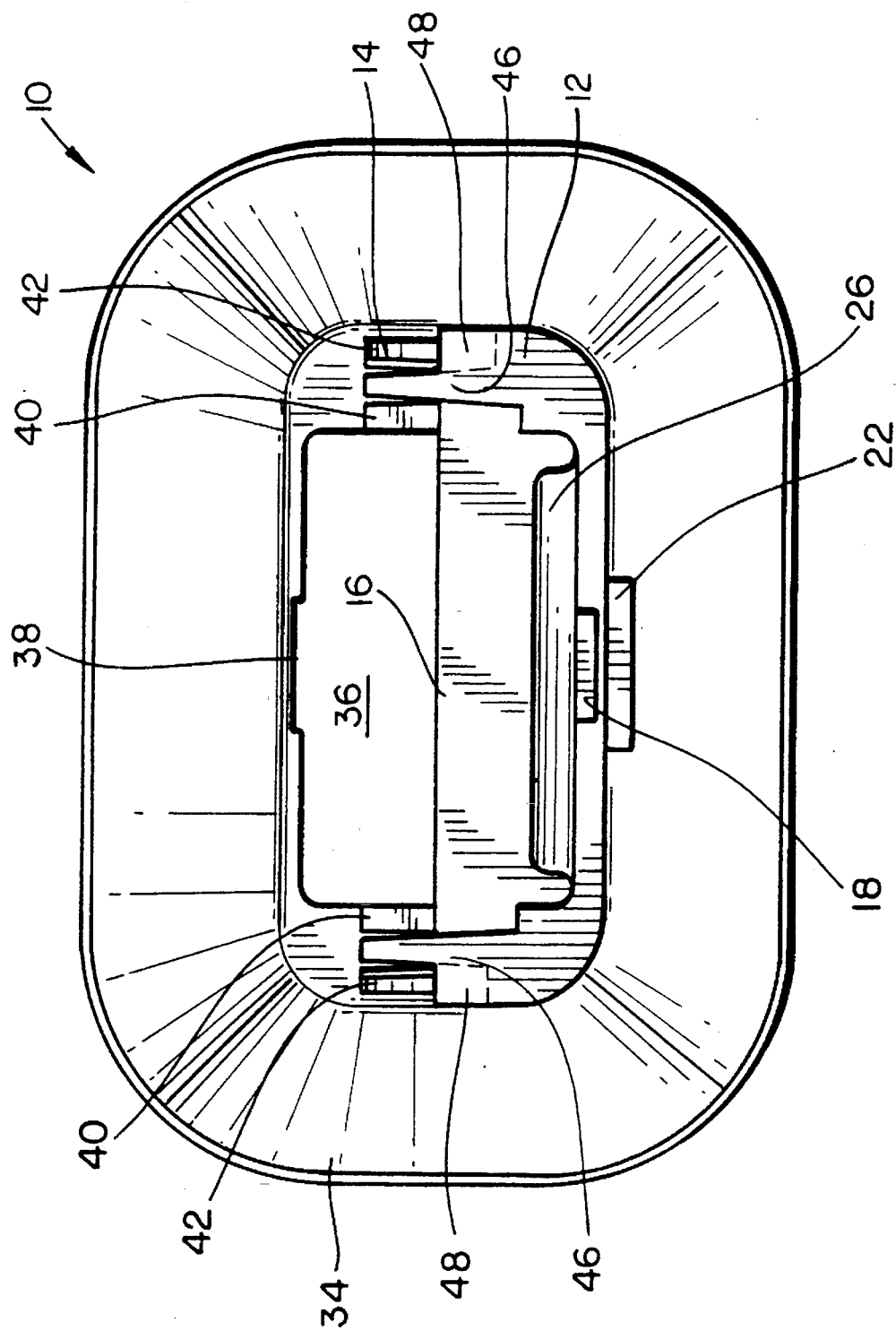
FIG. 3 is an end view of the encapsulating grommet taken as indicated by line 3—3 in FIG. 1.
Figure 4:
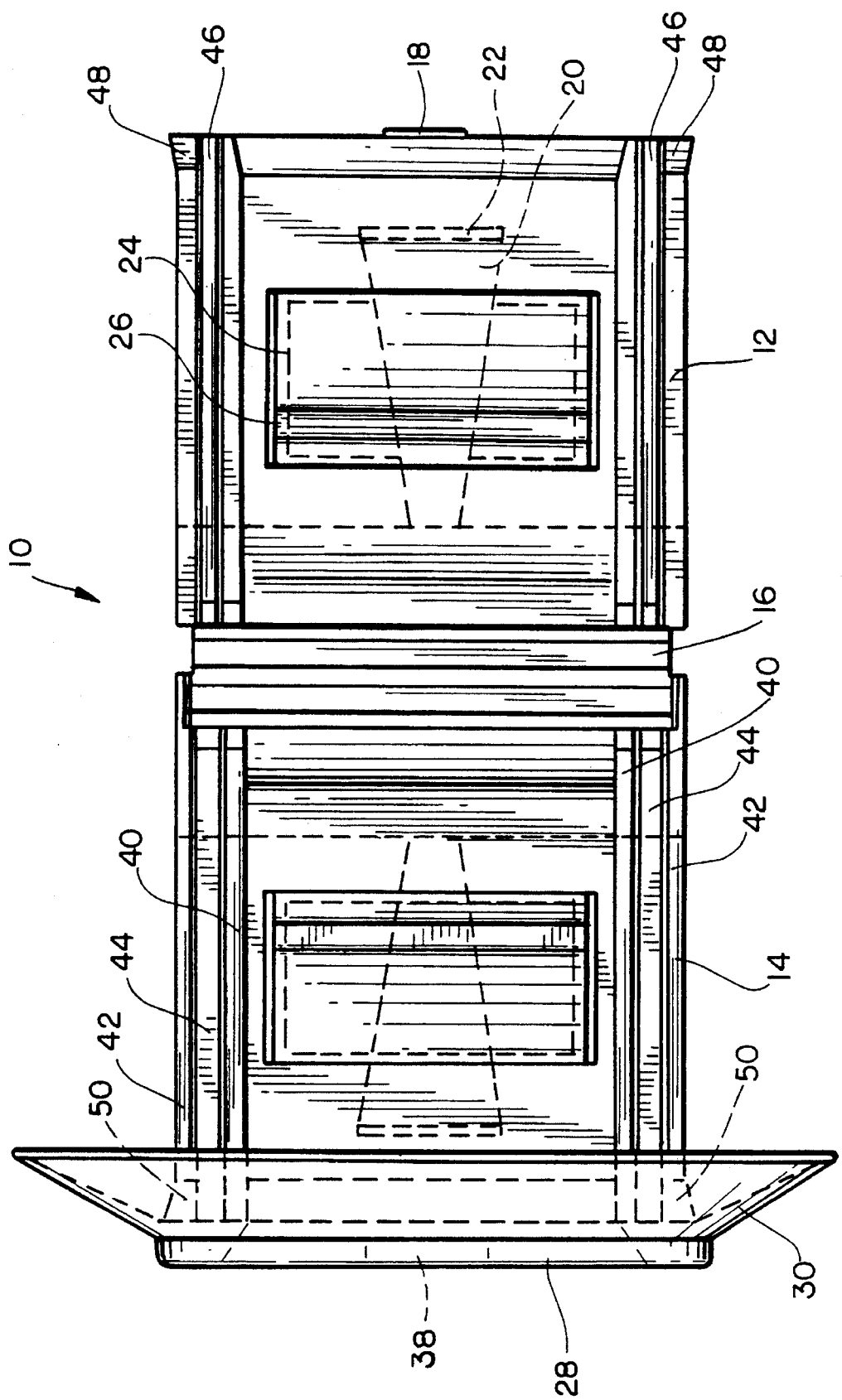
FIG. 4 is a plan view of the encapsulating grommet taken as indicated by line 4—4 in FIG. 1.

The first half body portion 12 includes a locking tab 18, which may also be seen in FIGS. 3 and 4. Both the first and second half body portions 12, 14 include on their external surfaces (lower in FIG. 1) an outwardly extending projection 20 defining a shoulder 22. The projection 20 for the second half body portion 14 is also visible in FIG. 2, while the shoulder 22 of the projection 20 for the first half body portion 12 is also visible in FIG. 3. Further, both the first and second half body portions 12, 14 include on their internal surfaces (upper in FIG. 1) an inwardly extending projection 24 defining a retention ledge 26. These are visible in FIG. 2 (for the second half body portion 14) and in FIG. 3 (for the first half body portion 12).

Referring back to FIG. 1, the encapsulating grommet 10 has a rectangular frame member 28 attached to and integrally molded therewith. The rectangular frame member 28 is surrounded by a head flange 30 having a front surface 32 and a back surface 34. The umbrella-like head flange 30 is molded in one piece on one of the two half body portions to maintain a good seal between the grommet 10 and the underlying support panel on which it is being used.

Figure 5:
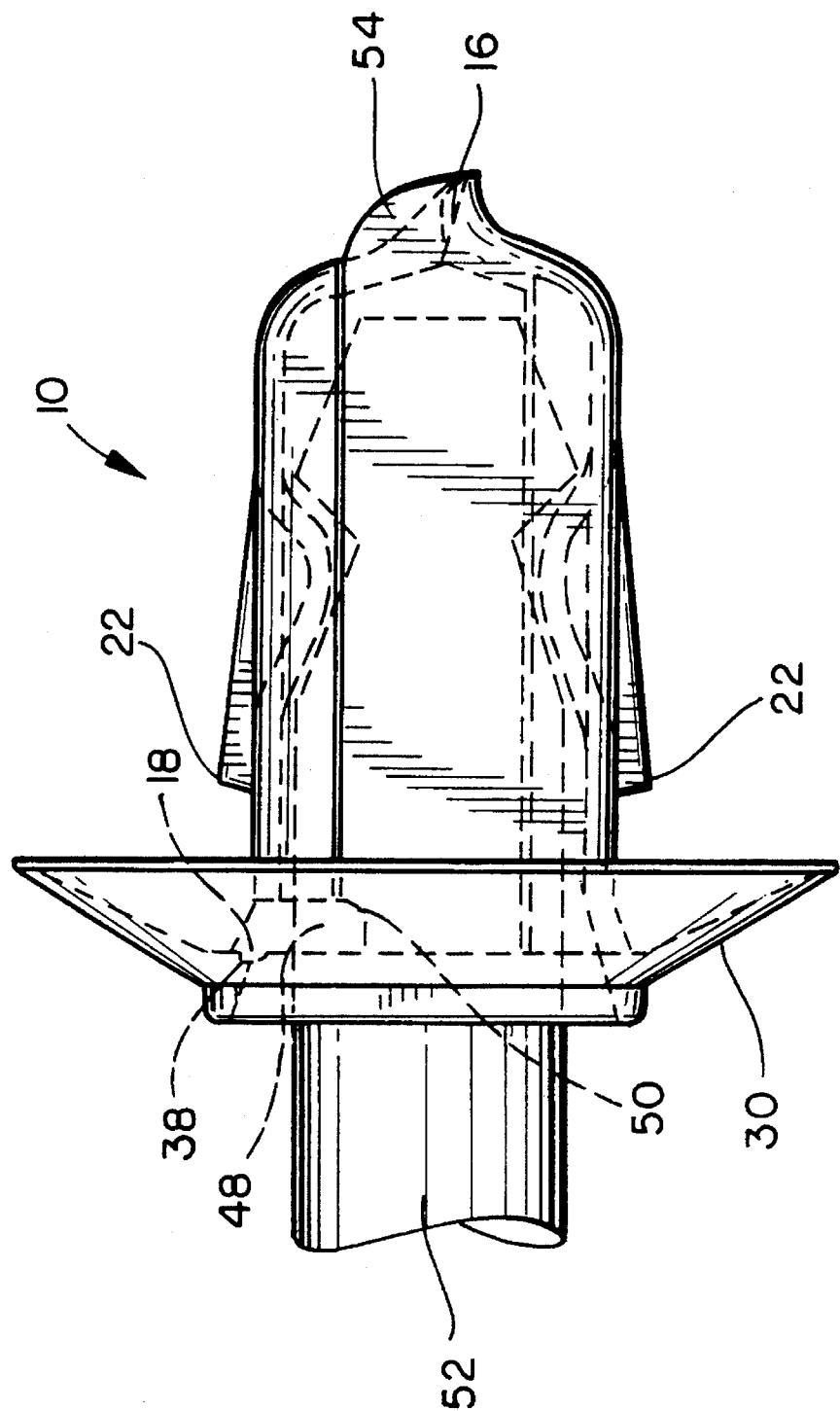
FIG. 5 is a side plan view showing the encapsulating grommet in a folded position and including a push-pin with which it is intended to be used.

The back surface 34 of head flange 30 is visible in FIG. 2. The rectangular frame member 28 (seen in phantom lines) has a central opening 36. The back surface 34 is also partly visible in FIG. 3, its lower half being obscured by hinge portion 16. At the top edge of the central opening 36 is a locking slot 38 (also visible in FIG. 2) to accommodate locking tab 18. When the first half body portion 12 and the second half body portion 14 are closed against one another about hinge portion 16, as shown in FIG. 5, locking tab 18 fits into locking slot 38 to hold the encapsulating grommet 10 in a closed condition. This snap-lock feature permits the grommet 10 to be shipped in a folded position.

Referring now to FIGS. 2 and 3, the former is a cross section taken as indicated by line 2—2 in FIG. 1, and therefore is a cross section taken through second half body portion 14.

Second half body portion 14 has, on its two lateral edges, an inner wall 40 and an outer wall 42 between which is a channel 44. In FIG. 3, first half body portion 12 has a wall 46 on each of its two lateral edges. When first half body portion is folded over onto second half body portion 14 by means of hinge portion 16, wall 46 is disposed within channel 44. The interlocking side wall structure so produced acts as a labyrinth to seal the inside of the encapsulating grommet 10 from dust and water.

Each wall 46 of first half body portion 12 has a counterforce tab 48, which is visible in both FIGS. 1 and 3, as well as in FIG. 4. Further, each outer wall 42 of the second half body portion 14 has a counterforce slot 50. Each counterforce tab 48 fits into its respective counterforce slot 50, as shown in FIG. 5, when the encapsulating grommet 10 is in a closed position to prevent the first half body portion 12 from being pushed downward when a push-pin is inserted through central opening 36.

Turning to FIG. 4, which is a plan view of encapsulating grommet 10 taken as indicated by line 4—4 in FIG. 1, one may note the alignment of wall 46 of first half body portion 12 with channels 44 between inner walls 40 and outer walls 42 of second half body portion 14. Inwardly extending projections 24 and retention ledges 26 may be seen on each of the first and second half body portions. 12, 14, while outwardly extending projections 20 and associated shoulders 22 may be seen represented in phantom lines.

FIG. 5 is a side plan view showing the encapsulating grommet 10 in a folded or closed condition and holding a push-pin 52 of the variety with which it is intended to be used. It will be noted, both here in FIG. 5 and in FIG. 1, that the outer side walls 42 have extensions 54 which cover any opening that will remain, and in fact is inherent in plastic hinges of this sort, when hinge portion 16 is folded to place the encapsulating grommet 10 into the condition shown in FIG. 5.

Also shown in FIG. 5 is the locking of locking tab 18 into locking slot 38, and the location of counterforce tab 48 within counterforce slot 50.

Figure 6:
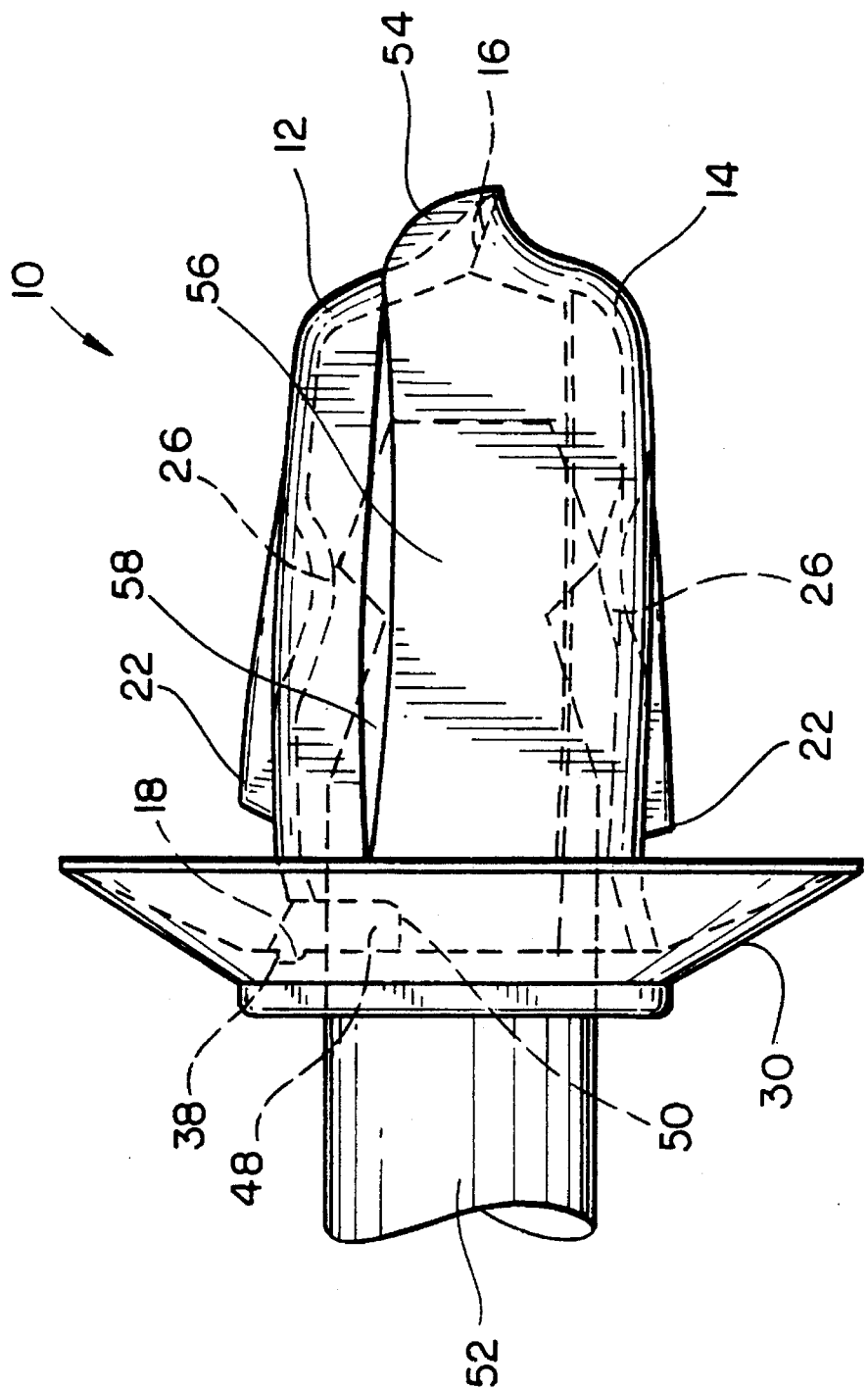
FIG. 6 is a side plan view analogous to that given in FIG. 5 and showing the relationship between the encapsulating grommet and a push-pin, as the latter is being inserted or extracted from the former.

FIG. 6 is a side plan view analogous to that given in FIG. 5 and showing the relationship between encapsulating grommet 10 and push-pin 52, when the push-pin 52 is being inserted into or extracted from the encapsulating grommet 10. In either case, as the head 56 of push-pin 52 encounters the retention ledges 26 on the internal surfaces of the first and the second half body portions 12,14, the first and second half body portions 12,14 flex apart from one another as shown by the presence of gap 58. This resilient flexing reduces the effort required to insert and to extract the push-pin 52 from encapsulating grommet 10, and reduces wear on the retention ledges 26, permitting multiple insertions and extractions of the push-pin pin 52. The gap 58 disappears once the push-pin 52 has been fully inserted, as shown in FIG. 5, or fully removed. The interlocking side wall structure defined by wall 46 of first half body portion 12 and inner wall 40 and outer wall 42 of second half body portion 14 is maintained during this resilient flexing to preserve the labyrinth seal preventing dust and water from entering the inside of encapsulating grommet 10.

In use, the encapsulating grommet 10 is pushed into a rectangular fitting hole in a supporting panel, so that shoulders 22 are braced against the inside surface of the supporting panel in response to the force produced by the overdrive function of the resilient umbrella-like head flange 30, and to keep encapsulating grommet 10 in the hole when a push-pin 52 is extracted therefrom.

The present encapsulating grommet 10 is molded in an open position, which permits a wider range of internal features to be incorporated into the mold.

While a particular embodiment of the present invention has been shown and described, it is clear that various changes and modifications may be made thereto, and it is therefore intended in the following claims to cover all modifications and changes as may fall within the true spirit and scope of the invention.

What is claimed is:

1. An encapsulating grommet for retaining a covering panel or other structure to a supporting panel having a rectangular fitting hole by means of a push-pin lockingly mateable therewith and adopted to absorb variations in the relative positions of the supporting panel and the covering panel or other structure, said encapsulating grommet being an integrally molded member comprising:

a first half body portion and a second half body portion separated from one another by a hinge portion, said first half body portion and said second half body portion being foldable toward one another about said hinge portion to form a body portion having a substantially rectangular cross section for mating with the shape of the rectangular fitting hole in said supporting panel and an internal cavity of like cross section;

said first half body portion having a side wall on each of two lateral edges, and said second half body portion having an inner and an outer side wall separated by a channel on each of two lateral edges, said side walls of said first half body portion fitting into said channels between said inner and outer side walls on said second body portion when said first and second half body portions are closed onto one another about said hinge portion;

one of said first and second body portions having a rectangular frame member with a central opening therein and surrounded by a head flange, said central opening communicating with and providing access to said internal cavity when said first and second half body portions are closed onto one another about said hinge portion, said head flange having a front surface and a back surface and being inclined toward said hinge portion in the manner of an umbrella.

2. An encapsulating grommet as claimed in claim 1 wherein said outer side walls of said second half body portion include an extension adjacent to said hinge portion so that said hinge portion may be covered laterally when said first and second half body portions are closed onto one another about said hinge portion.

3. An encapsulating grommet as claimed in claim 1 wherein the other of said first and second body portions has a locking tab on an edge opposite said hinge portion and the portion having said rectangular frame member has a locking slot in a corresponding position, so that said first and second half body portions may be locked into a closed position when closed onto one another about said hinge portion to enable said encapsulating grommet to be shipped in a closed condition ready for use.

4. An encapsulating grommet as claimed in claim 1 wherein said first and second half body portions each have an external surface which has an outwardly extending projection defining a shoulder, said shoulders being below said head flange when said first and second half body portions are closed onto one another about said hinge portion, so that said encapsulating grommet may be retained within said rectangular fitting hole and said head flange may provide a resilient overdrive feature maintaining said encapsulating grommet in a fixed position within said rectangular fitting hole.

5. An encapsulating grommet as claimed in claim 1 wherein said first and second half body portions each have an internal surface which has an inwardly extending projection defining a retention ledge, so that a push-pin having an indentation corresponding to said retention ledges may be snap-fit into said internal cavity of said encapsulating grommet.

6. An encapsulating grommet as claimed in claim 1 wherein said side walls of said first half body portion each include a counterforce tab, and said outer side walls of said second body portion each include a counterforce slot so that, when said first and second half body portions are closed onto one another about said hinge portion, said counterforce tabs may be disposed in said counterforce slots to relieve any force that may be exerted upon said hinge portion when said push-pin is introduced into said internal cavity.

7. An encapsulating grommet as claimed in claim 6 wherein said counterforce tabs are at locations on said side walls of said first half body portion farthest from said hinge portion, and said counterforce slots are at locations on said outer side walls of said second half body portion farthest from said hinge portion, so that, when first and second half body portions are closed on one another about said hinge portion, said counterforce tabs and said counterforce slots, interfering with one another, may be disposed adjacent to said back surface of said head flange.

8. An encapsulating grommet as claimed in claim 1, said encapsulating grommet being molded from a flexible polymeric resin material, so that said first and second half body portions may flex apart from one another when said push-pin is lockingly mated therewith after said first and second half body portions have been folded against one another and said encapsulating grommet inserted into said rectangular fitting hole, said side wall of said first half body portion remaining between said inner and outer walls of said second half body portion during such flexing to prevent dust and water from entering said internal cavity of said encapsulating grommet.

* * * * *